United States Patent [19]

Huang et al.

[11] Patent Number: 5,223,570
[45] Date of Patent: Jun. 29, 1993

[54] METHOD FOR THE PREPARATION OF GRAFT POLYMER DISPERSIONS HAVING BROAD PARTICLE SIZE DISTRIBUTION WITHOUT WILDLY FLUCTUATING VISCOSITIES

[75] Inventors: Mao Y. Huang, Riverview, Mich.; Kenneth C. Scott, Decatur, Ill.; Joseph F. Louvar, Lincoln Park, Mich.

[73] Assignee: BASF Corporation, Parsippany, N.J.

[21] Appl. No.: 681,306

[22] Filed: Apr. 1, 1991

Related U.S. Application Data

[62] Division of Ser. No. 476,078, Feb. 7, 1990, abandoned.

[51] Int. Cl.$^5$ .................. C08F 285/00; C08G 18/63; C08G 65/28; C08J 9/04
[52] U.S. Cl. ...................... 525/53; 525/440; 525/445; 525/528; 525/529; 521/67; 521/137
[58] Field of Search ............. 525/53, 529, 445

[56] References Cited

U.S. PATENT DOCUMENTS

| | | | |
|---|---|---|---|
| 3,950,317 | 4/1976 | Patton, Jr. et al. | 525/404 |
| 4,041,105 | 8/1977 | O'Shea et al. | 525/404 |
| 4,208,314 | 6/1980 | Priest et al. | 525/523 |
| 4,230,823 | 10/1980 | Alberts et al. | 525/529 |
| 4,522,976 | 6/1985 | Grace et al. | 525/404 |
| 4,623,674 | 11/1986 | Bailey, Jr. | 525/404 |
| 4,661,531 | 4/1987 | Davis et al. | 524/507 |
| 4,751,265 | 6/1988 | Asanuma et al. | 525/323 |
| 5,106,875 | 4/1992 | Horn et al. | 525/445 |

*Primary Examiner*—Vasu S. Jagannathan
*Attorney, Agent, or Firm*—Martin P. Connaughton

[57] ABSTRACT

A method for preparing graft polymer dispersions having broad particle size distribution without wildly fluctuating viscosities is disclosed. The method comprises:
(a) preparing intermediate graft polyol dispersions containing 30 percent by weight or less solids to achieve a broad distribution of partial sizes in a continuous process and
(b) charging the intermediate graft polymer dispersion of (a) to a semi-batch reactor as seeds for further grafting to increase the solids content of the dispersion to above 30 percent by weight. The graft polymer so formed is useful in the production of polyurethanes.

6 Claims, No Drawings

METHOD FOR THE PREPARATION OF GRAFT POLYMER DISPERSIONS HAVING BROAD PARTICLE SIZE DISTRIBUTION WITHOUT WILDLY FLUCTUATING VISCOSITIES

This is a division, of application Ser. No. 476,078 filed Feb. 7, 1990 now abandoned.

BACKGROUND OF THE INVENTION

1. Field of the Invention

The present invention relates to a method for the preparation of graft polymer dispersions having a broad particle size distribution and a solids content of above about thirty percent by weight without wildly fluctuating viscosities. The present invention also relates to foams and molded articles formed by the graft polymer dispersions of the present invention.

2. Description of the Related Art

The related art as evidenced by U.S. Pat. Nos. 3,652,658; 3,875,258; 3,950,317; and Reissue Patent Nos. U.S. Pat. No. Re. 28,715 and U.S. Pat. No. Re. 29,014 discloses the preparation of graft polymer dispersions which are useful in the preparation of polyurethanes by the polymerization of ethylenically unsaturated monomers in polyols. U.S. Pat. No. 3,931,092 discloses the preparation of polymeric solids by carrying out the polymerization in the presence of a free radical initiator and an organic solvent.

Chaudhary, U.S. Pat. No. 4,012,462 discloses high impact polymers having broad particle size distribution. The polymers of Chaudhary are rubber polymers and the particle size distribution is achieved by a bulk suspension three-step polymerization process.

Swoboda et al, U.S. Pat. No. 4,224,419 disclose a mixture of styrene and acrylonitrile copolymers which are toughened with rubbery acrylic ester polymers. Products formed from this material have high impact weather resistant properties. The thermoplastic compositions of Swoboda et al are basically a mixture of a first graft copolymer, which is formed by a crosslinked acrylic ester polymer and a mixture of styrene and acrylonitrile, and a second separately prepared, graft copolymer which is formed from a crosslink of an acrylic ester polymer and a mixture of styrene and acrylonitrile. The two graft copolymers are then mixed with a hard component which consists of one or more copolymers of styrene and/or a-methyl styrene with acrylonitrile.

Hosoi et al, U.S. Pat. No. 4,624,987 disclose a vinyl chloride polymer composition containing 5 to 50 percent MBS resin which is prepared by first graft polymerizing a monomer component and a methacrylate onto a styrenebutadiene rubber and onto that copolymer, secondly graft polymerizing a vinyl monomer to obtain a substantially uniform particle size within the composition. The products formed therefrom have excellent solvent-resistance, transparency and impact-resistant properties.

Ramlow et al, U.S. Pat. No. 4,334,049 disclose a process for the preparation of finely-divided solid polymers in a polyol. These compositions are prepared by free radical polymerization on ethylenically unsaturated monomers in an organic solvent employing an alkylene oxide adduct of a styrene-allyl alcohol copolymer stabilizer.

None of the related art, insofar as is known, either alone or in combination, teaches the method of preparation of graft polymers of the present invention. None of the art, alone or in combination, would suggest to one of ordinary skill in the art that viscosity fluctuations in graft polyol samples may be eliminated or greatly reduced by the method of preparation as disclosed in the present invention. None of the references discloses the preparation of graft polyol dispersions using a continuous process to produce a seed graft polyol having up to 30 percent solid polymer dispersion, and, in a semi batch process, using the graft polyols prepared in the continuous process, as seeds to produce a graft polyol having 30 percent or more solids content and a relatively uniform viscosity from sample to sample.

SUMMARY OF THE INVENTION

The present invention is a two-step graft polyol process to produce a graft polyol dispersion having a broad particle size distribution and a high percent solids level of greater than 30 percent. The dispersions do not vary greatly from sample to sample and so avoid wildly fluctuating viscosities which were inherent in compositions of the prior art. The invention is a two-step process for the preparation of graft polyols in which the first step produces 30 percent or less solids graft polyols as seeds in a continuous process and the second step further grafts the seeds to a 30 percent or more solids level in a semi-batch process. The viscosity fluctuation is very slight between samples. The graft polyols are used in preparing polyurethanes. The present invention combines the characteristics of continuous and semi-batch processes.

DETAILED DESCRIPTION OF THE PREFERRED EMBODIMENTS

The present invention is a two-step graft polyol process capable of producing graft polyols wherein the viscosity properties do not vary from sample to sample. The method of the present invention is a two-step process. The first step involves producing a graft polyol in a continuous process having 30 percent or less solids content. The second step involves using the graft polyol prepared in the continuous process as seeds to produce graft polyols having 30 percent or more solids content in a semi-batch process. This two-step process results in a very slight to non-existent fluctuation of viscosity between samples.

The properties of graft polyols are dependent upon not only their chemical compositions but also the amount, shape, size, and size distribution of dispersed solid particles. Generally the particle size distribution is narrow for graft polyols prepared in a semi-batch process while broad for graft polyols prepared in a continuous process. In a batch or semi-batch reactor, particles are generated mainly in the early stage of the reaction. Further reaction favors the growth of the existing particles and results in a narrow particle size distribution. In a continuous reactor, the combination of a continuous wash-out of existing particles, competitive growth of existing particles, and formation of new particles leads to a broad distribution of particle sizes. The continuous process of the prior art has been successfully used to prepare graft polyols up to about 30 percent solids content. Small fluctuations in viscosity in those products have been acceptable but noticeable nonetheless. Attempts to prepare graft polyols containing 30 percent or more solids content by the continuous process of the prior art has resulted in products with wildy fluctuating viscosities from sample to sample.

In the preferred embodiment of the present invention, the method is a two-step process. Step (A) is a continuous process to prepare a seed graft polyol containing up to 30 percent solid polymer dispersions with a broad particle size distribution. The continuous process consists of a flow reactor, a second reactor and two feed tanks. The ingredients of the seed graft polyol, namely monomers, initiators, polyols and etc., are appropriately distributed between the two feed tanks. A first feed tank contains a mixture of polyols and initiator. A second feed tank contains a mixture of monomers. Other ingredients such as a chain transfer agent may be charged to either feed tank wherever appropriate. A preformed graft polyol is charged to the flow reactor as a starting seed. A nitrogen atmosphere is preferably maintained in the reactor and the reaction is carried out under suitable pressure conditions. The reaction temperature should be about 25° to 180° C. After the starting seed in the flow reactor is heated to the desired temperature, the reaction is initiated when two feed streams from the two respective feed tanks are fed into the flow reactor at specified rates. The feed rates of the two feed streams are specified to achieve a desired residence time, preferably from 0.5 to 2 hours, for the product in the flow reactor. The product in the flow reactor is withdrawn simultaneously with the addition of material from the two feed streams in order to keep a constant liquid level in the flow reactor. The product withdrawn from the flow reactor is transferred to the second reactor, also maintained at the same reaction temperature, where residual reaction may take place. The reaction product in the second reactor may be continuously discharged to a receiving tank after the second reactor is filled to its capacity. The continuous process can be interrupted when the feed tanks are exhausted or the receiving tank is full. This seed graft polyol, prepared in the said continuous process and contains up to about 30% solid polymer dispersions, has uniform viscosity.

Step (B) is a semi-batch process to increase the solids content of the seed graft polyol made in the continuous process of Step (A) to above 30%. The semi-batch process consists of a semi-batch reactor and two feed tanks. Specifically, a measured amount of the seed graft polyol containing up to 30 percent solid polymer dispersions is charged to the semi-batch reactor from its hold tank. Alternately the same amount of the seed graft polyol may be charged to the semi-batch reactor directly from the flow reactor. The stoichiometric amounts of the balance ingredients for making the seed graft polyol into the target product are appropriately charged to the two feed tanks. The reaction is carried out at the same temperature as in Step (A). The two feed streams from the two feed tanks are fed into the semi-batch reactor. When all ingredients are fed into the reactor, the reaction is allowed to continue for another 0.5 to 2 hours. Once again, the reaction is conducted preferably in an inert atmosphere such as nitrogen. What has surprisingly been found is that the monomers and polyols which are fed into the semi-batch reactor do not form new polymer dispersions, but rather coat existing solid polymer dispersions to increase the particle sizes of the seed graft polymer. As a result the characteristics of the broad particle size distribution of the seed graft polyol has been essentially preserved in the reaction product. The reaction product is then vacuum stripped to obtain the finished graft polyol. The finished graft polyol with a solids content of greater than about 30 percent has a relatively uniform viscosity from sample to sample and has the characteristics of a continous process product.

Unsaturated polyols which are employed in the present invention may be prepared by the reaction of any conventional polyol such as those described below with an organic compound having both ethylenic unsaturation and a hydroxyl, carboxyl, anhydride, isocyanate or epoxy group, or they may be prepared by employing an organic compound having both ethylenic unsaturation and a hydroxyl, carboxyl, anhydride, isocyanate or epoxy group as a reactant in the preparation of the conventional polyol. Representatives of such organic compounds include unsaturated mono- and polycarboxylic acids and anhydrides such as maleic acid and anhydride, fumaric acid, crotonic acid and anhydride, propenyl succinic anhydride, acrylic acid, acryoyl chloride, hydroxy ethyl acrylate or methacrylate and halogenated maleic acids and anhydrides, unsaturated polyhydric alcohols such as 2-butene-1,4-diol, glycerol allyl ether, trimethylolpropane allyl ether, pentaerythritol allyl ether, pentaerythritol vinyl ether, pentaerythritol diallyl ether, and 1-butene-3,4-diol, unsaturated epoxides such as 1-vinylcyclohexene-3,4-epoxide, butadiene monoxide, vinyl glycidyl ether (1-vinyloxy-2,3-epoxy propane), glycidyl methacrylate and 3-allyloxypropylene oxide (allyl glycidyl ether) and aliphatic and aromatic isocyanates and polyisocyanates. If a polycarboxylic acid or anhydride is employed to incorporate unsaturation into the polyols, it is preferable to react the unsaturated polyol with an alkylene oxide, preferably ethylene or propylene oxide, to replace the carboxyl groups with hydroxyl groups prior to employment in the present invention. The amount of alkylene oxide employed is such as to reduce the acid number of the unsaturated polyol to about 5 or less.

Representative polyols essentially free from ethylenic unsaturation which may be employed to prepare the unsaturated polyols are well known to those skilled in the art. They are often prepared by the catalytic condensation of an alkylene oxide or mixture of alkylene oxides either simultaneously or sequentially with an organic compound having at least two active hydrogen atoms, such as evidenced by U.S. Pat. Nos. 1,922,459; 3,190,927; and 3,346,557. Representative polyols include polyhydroxyl-containing polyesters, polyoxyalkylene polyether polyols, polyhydroxy-terminated polyurethane polymers, polyhydroxyl-containing phosphorus compounds, and alkylene oxide adducts of polyhydric polythioesters, polyacetals, aliphatic polyols and thiols, ammonia, and amines including aromatic, aliphatic, and heterocyclic amines, as well as mixtures thereof. Alkylene oxide adducts of compounds which contain an amino group and a hydroxyl group. Also, alkylene oxide adducts of compounds which contain one SH group and one OH group as well as those which contain an amino group and an SH group may be used. Generally, the equivalent weight of the polyols will vary from 100 to 10,000 preferably from 1000 to 3000.

Any suitable hydroxy-terminated polyester may be used such as are prepared, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, a-hydromuconic acid, b-hydromuconic acid, a-butyl-a-ethyl-glutaric acid, a,b-diethyl-succinic acid, isophthalic acid, terephthalic acid, hemimellitic acid, and 1,4-cyclohexanedicarboxylic acid. Any suitable polyhydric alcohol, including both aliphatic and aromatic, may be used such as ethylene glycol, propylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolethane, 1,2,6-hexanetriol, a-methyl glucoside, pentaerythritol, and sorbitol. Also included within the term "polyhydric alcohol" are compounds derived from phenol such as 2,2-bis(4-hydroxyphenyl)propane, commonly known as Bisphenol A.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Any suitable polyoxyalkylene polyether polyol may be used such as the polymerization product of an alkylene oxide or a mixture of alkylene oxides with a polyhydric alcohol. Any suitable polyhydric alcohol may be used such as those disclosed above for use in the preparation of the hydroxy-terminated polyesters. Any suitable alkylene oxide may be used such as ethylene oxide, propylene oxide, butylene oxide, amylene oxide, and mixtures of these oxides. The polyoxyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide. The polyoxyalkylene polyether polyols may have either primary or secondary hydroxyl groups. Included among the polyether polyols are polyoxyethylene glycol, polyoxypropylene glycol, polyoxybutylene glycol, polyoxypropylene glycol, polyoxybutylene glycol, polytetramethylene glycol, block copolymers, for example, combinations of polyoxypropylene and polyoxyethylene glycols, poly 1,2-oxybutylene and polyoxyethylene glycols, and random copolymer glycols prepared from blends of two or more alkylene oxides or by the sequential addition of two or more alkylene oxides. The polyoxyalkylene polyether polyols may be prepared by any known process such as, for example, the process disclosed by Würtz in 1859 and Encyclopedia of Chemical Technology, Vol. 7, pp. 257–262, published by Interscience Publishers, Inc. (1951) or in U.S. Pat. No. 1,922,459. Polyethers which are preferred include the alkylene oxide addition products of trimethylolpropane, glycerine, pentaerythritol, sucrose, sorbitol, propylene glycol, and 2,2'-(4,4'-hydroxyphenyl)propane and blends thereof having equivalent weights of from 100 to 10,000.

Suitable polyhydric polythioethers which may be condensed with alkylene oxides include the condensation product of thiodiglycol or the reaction product of a dicarboxylic acid such as is disclosed above for the preparation of the hydroxyl-containing polyesters with any other suitable thioether glycol.

Polyhydroxyl-containing phosphorus compounds which may be used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72 percent to about 95 percent.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkanethiols containing one or two —SH groups such as 2-mercaptoethanol, 1,2-ethanedithiol, 1,2-propanedithiol, 1,3-propanedithiol, and 1,6-hexanedithiol; alkene thiols such as 2-butene-1,4-dithiol; and alkyne thiols such as 3-hexyne-1,6-dithiol.

Suitable amines which may be condensed with alkylene oxides include aromatic amines such as aniline, o-chloroaniline, p-aminoaniline, 1,5-diaminonaphthalene, methylene dianiline, the condensation products of aniline and formaldehyde, and 2,3- 2,6-, 3,4-, 2,5-, and 2,4-diaminotoluene; aliphatic amines such as methylamine, triisopropanolamine, ethylenediamine, 1,3-diaminopropane, 1,3-diaminobutane, 1,4-diaminobutane, and ammonia.

Also, polyols containing ester groups can be employed in the subject invention. These polyols are prepared by the reaction of an alkylene oxide with an organic dicarboxylic acid anhydride and a compound containing reactive hydrogen atoms. A more comprehensive discussion of these polyols and their method of preparation can be found in U.S. Pat. Nos. 3,585,185; 3,639,541 and 3,639,542.

As mentioned above, the graft copolymer dispersions of the invention are prepared by the situ polymerization, in the above-described polyols and a small amount of a preformed graft polymer dispersion, of an ethylenically unsaturated monomer or a mixture of ethylenically unsaturated monomers. Representative ethylenically unsaturated monomers which may be employed in the present invention include butadiene, isoprene, 1,4-pentadiene, 1,5-hexadiene, 1,7-octadiene, styrene, alpha-methylstyrene, methylstyrene, 2,4-dimethylstyrene, ethylstyrene, isopropylstyrene, butylstyrene, phenylstyrene, cyclohexylstyrene, benzylstyrene, and mixtures thereof; substituted styrenes such as chlorostyrene, 2,5-dichlorostyrene, bromostyrene, fluorostyrene, trifluoromethylstyrene, iodostyrene, cyanostyrene, nitrostyrene, N,N-dimethylaminostyrene, acetoxylstyrene, methyl-4-vinylbenzoate, phenoxystyrene, p-vinyldiphenyl sulfide, p-vinylphenyl oxide, and mixtures thereof; the acrylic and substituted acrylic monomers such as acrylonitrile, acrylic acid, methacrylic acid, methylacrylate, 2-hydroxyethyl acrylate, 2-hydroxyethyl methacrylate, methyl methacrylate, cyclohexyl methacrylate, benzyl methacrylate, isopropyl methacrylate, octyl methacrylate, methacrylonitrile, methyl alpha-chloroacrylonitrile, acrylamide N,N-dimethylacrylamide, N,N-dibenzylacrylamide, N-butylacrylamide, methacrylyl formamide, and mixtures thereof; the vinyl esters, vinyl ethers, vinyl ketones, etc. such as vinyl acetate, vinyl chloroacetate, vinyl alcohol, vinyl butyrate, isopropenyl acetate, vinyl formate, vinyl acrylate, vinyl methacrylate, vinyl methoxyacetate, vinyl benzoate, vinyl iodide, vinyltoluene, vinylnaphthalene, vinyl bromide, vinyl fluoride, vinylidene bromide, 1-chloro-1-fluoroethylene, vinylidene fluoride vinylidene chloride vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3,4-dihydro-1,2-pyran, 2-butoxy-2'-vinyloxy diethyl ether, vinyl 2-ethylmercaptoethyl ether, vinyl methyl ketone, vinyl ethyl ketone, vinyl phosphonates such as bis(beta-chloroethyl) vinyl-phosphate, vinyl phenyl ketone, vinyl ethyl sulfide, vinyl ethyl sulfone, N-methyl-N-vinyl acetamide, N-vinyl-pyrrolidone, vinyl imidazole, divinyl sulfide, divinyl sulfoxide, divinyl sulfone, sodium vinylsulfonate, methyl vinylsulfonate, N-vinyl pyrrole, and the like; dimethyl fumarate, dimethyl maleate, maleic acid, crotonic acid, fumaric acid, itaconic acid, monomethyl itaconate, t-butylaminoethyl methacrylate, dimethylaminoethyl methacrylate, glycidyl acrylate, allyl alcohol, glycol monoesters of itaconic acid, dichlorobutadiene, vinyl pyridine, and the like. Any of the known polymerizable monomers can be used and the compounds listed above are illustrative and not restrictive of the monomers suitable for use in this invention. Preferably the monomer is selected from the group consisting of acrylonitrile, styrene and mixtures thereof.

Illustrative polymerization initiators which my be employed are the well-known free radical types of vinyl polymerization initiators such as the peroxides, persulfates, perborates, percarbonates, azo compounds, etc. These include hydrogen peroxide, dibenzoyl peroxide, acetyl peroxide, benzoyl hydroperoxide, t-butyl hydroperoxide, di-t-butyl peroxide, lauroyl peroxide, butyryl peroxide, diisopropylbenzene hydroperoxide, cumene hydroperoxide, paramenthane hydroperoxide, diacetyl peroxide, di-a-cumyl peroxide, dipropyl peroxide, diisopropyl peroxide, isopropyl-t-butyl peroxide, butyl-t-butyl peroxide, difuroyl peroxide, bis(triphenylmethyl) peroxide, bis(p-methoxybenzoyl) peroxide, p-monomethoxybenzoyl peroxide, rubene peroxide, ascaridol, t-butyl peroxybenzoate, diethyl peroxyterephthalate, propyl hydroperoxide, isopropyl hydroperoxide, n-butyl peroxybenzoate, isopropyl hydroperoxide, n-butyl hydroperoxide, t-butyl hydroperoxide, cyclohexyl hydroperoxide, trans-decalin hydroperoxide, a-methylbenzyl hydroperoxide, a-methyl-a-ethyl benzyl hydroperoxide, tetraline hydroperoxide, triphenylmethyl hydroperoxide, diphenylmethyl hydroperoxide, a,a'-azobis-(2-methyl heptonitrile), 1,1'-azobis(cyclohexane carbonitrile), 4,4'-azobis(4-cyanopentanoic acid), 2,2'-azobis(isobutyronitrile), 1-t-butylazo-1-cyanocyclohexane, persuccinic acid, diisopropyl peroxy dicarbonate, 2,2'-azobis(2,4-dimethylvaleronitrile), 2-t-butylazo-2-cyano-4-methoxy-4-methylpentane, 2,2'-azobis-2-methylbutanenitrile, 2-t-butylazo-2-cyanobutane, 1-t-amylazo-1-cyanocyclohexane, 2,2'-azobis(2,4-dimethyl-4-methoxyvaleronitrile), 2-t-butylazo-2-cyano-4-methylpentane, 2-t-butylazo-2-isobutyronitrile, t-butylperoxyisopropyl carbonate and mixtures thereof; a mixture of initiators may also be used. The preferred initiators are 2,2'-azobis(2-methylbutanenitrile), 2,2'-azobis (isobutyronitrile), 2,2'-azobis (2,4-dimethylvaleronitrile), 2-t-butylazo-2-cyano-4-methoxy-4-methylpentane, 2-t-butylazo-2-cyano-4-methylpentane, and 2-t-butylazo-2-cyanobutane. Generally, from about 0.01 percent to about 5 percent, preferably from about 0.5 percent to about 1.5 percent, by weight of initiator based on the weight of the monomer will be employed in the process of the invention.

Chain transfer agents may be employed as reaction moderators. The polymerization reaction may be carried out at temperatures between 25° C. and 180° C., preferably between 80° C. and 135° C. The polyol mixture contains at least 0.001 mole of unsaturation per mole of polyol and may contain as much as 3 mole of unsaturation per mole of polyol.

Among those chain transfer agents which may be employed are as follows: acetic acid, bromoacetic acid, chloroacetic acid, ethyl dibromoacetate, iodoacetic acid, tribromoacetic acid, ethyl tribromoacetate, trichloroacetic acid, ethyl trichloroacetate, acetone, p-bromophenylacetonitrile, p-nitrophenylacetylene, allyl alcohol, 2,4,6-trinitroaniline, p-ethynylanisole, 2,4,6-trinitroanisole, azobenzene, benzaldehyde, p-cyanobenzaldehyde, 2-butylbenzene, bromobenzene, 1,3,5-trinitrobenzene, benzochrysene, ethyl trinitrobenzoate, benzoin, benzonitrile, benzopyrene, tributylborane, 1,4-butanediol, 3,4-epoxy-2-methyl-1-butene, t-butyl ether, t-butyl isocyanide, 1-phenylbutyne, p-cresol, p-bromocumene, dibenzonaphthacene, p-dioxane, pentaphenyl ethane, ethanol, 1,1-diphenylethylene, ethylene glycol, ethyl ether, fluorene, N,N-dimethylformamide, 2-heptene, 2-hexene, isobutyraldehyde, diethyl bromomalonate, bromotrichloromethane, dibromoethane, diiodomethane, naphthalene, 1-naphthol, 2-naphthol, methyl oleate, 2,4,4-triphenyl-1-pentene, 4-methyl-2-pentene, 2,6-diisopropylphenol, phenyl ether, phenylphosphine, diethylphosphine, dibutylphosphine, phosphorus trichloride, 1,1,1-tribromopropane, dialkylphthalate, 1,2-propanediol, 3-phosphinopropionitrile, 1-propanol, pyrocatechol, pyrogallol, methyl stearate, tetraethylsilane, triethylsilane, dibromostilbene, a-bromostyrene, a-methylstyrene, tetraphenyl succinonitrile, 2,4,6-trinitrotoluene, p-toluidine, N,N-dimethyl-p-toluidine, a-cyano-p-tolunitrile, a'a'-dibromo-p-xylene, 2,6-xylenol, diethyl zinc, dithiodiacetic acid, ethyl dithiodiacetic acid, 4,4'-dithiobisanthranilic acid, benzenethiol, o-ethoxybenzenethiol, 2,2'-dithiobisbenzothiazole, benzyl sulfide, 1-dodecanethiol, ethanethiol, 1-hexanethiol, 1-naphthalenethiol, 2-naphthalenethiol, 1-octanethiol, 1-heptanethiol, 2-octanethiol, 1-tetradecanethiol, a-toluenethiol, isopropanol, 2-butanol, toluene, bromochloromethane, 1-butanol, carbon tetrachloride, 2-mercaptoethanol, octadecyl mercaptan, carbon tetrabromide and tertiary dodecyl mercaptan. The chain transfer agent employed may range from 0.1 to 10 percent by weight based on the weight of the monomer.

The polyurethane foams employed in the present invention are generally prepared by the reaction of a graft polymer dispersion with an organic polyisocyanate in the presence of a blowing agent and optionally in the presence of additional polyhydroxyl-containing components, chain-extending agents, catalysts, surface active agents, stabilizers, dyes, fillers and pigments. Suitable processes for the preparation of cellular polyurethane plastics are disclosed in U.S. Pat. No. Re.24,514 together with suitable machinery to be used in conjunction therewith. When water is added as the blowing agent, corresponding quantities of excess isocyanate to react with the water and produce carbon dioxide may be used. It is possible to proceed with the preparation of the polyurethane plastics by a prepolymer technique wherein an excess of organic polyisocyanate is reacted in a first step with the polyol of the present invention to prepare a prepolymer having free isocyanate groups which is then reacted in a second step with water and/or additional polyol to prepare a foam. Alternatively, the components may be reacted in a single working step commonly known as the "one-shot" technique of preparing polyurethanes. Furthermore, instead of water, low boiling hydrocarbons such as pentane, hexane, heptane, pentene, and heptene; azo compounds such as azohexahydrobenzodinitrile; halogenated hydrocarbons such as dichlorodifluoromethane, trichlorofluoromethane, dichlorodifluoroethane, vinylidene chloride, and methylene chloride may be used as blowing agents.

Organic polyisocyanates which may be employed include aromatic, aliphatic, and cycloaliphatic polyisocyanates and combinations thereof. Representative of these types are the diisocyanates such as m-phenylene diisocyanate, 2,4-toluene diisocyanate, 2,6-toluene diisocyanate, hexamethylene diisocyanate, tetramethylene diisocyanate, cyclohexane-1,4-diisocyanate, hexahydrotoluene, diisocyanate (and isomers), naphthalene-1,5-diisocyanate, 1-methoxyphenyl-2,4-diisocyanate, 4,4'-diphenylmethane diisocyanate, 4,4'-biphenylene diisocyanate, 3,3'-dimethoxy-4,4'-biphenyl diisocyanate, 3,3'-dimethyl-4,4'-biphenyl diisocyanate and 3,3'-dimethyldiphenylmethane-4,4'-diisocyanate; the triisocyanates such as 4,4',4''-triphenylmethane triisocyanate, and toluene 2,4,6-triisocyanate; and the tetraisocyanates such as 4,4'-dimethyldiphenylmethane-2,2'-5,5'-tetraisocyanate and polymeric polyiosocyanates such as polymethylene polyphenylene polyisocyanate. Especially useful due to their availability and properties are toluene diisocyanate, 4,4'-diphenylmethane diisocyanate and polymethylene polyphenylene polyisocyanate.

Crude polyisocyanates may also be used in the compositions of the present invention, such as crude toluene diisocyanate obtained by the phosgenation of a mixture of toluene diamines or crude diphenylmethane isocyanate obtained by the phosgenation of crude diphenylmethane diamine. The preferred or crude isocyanates are disclosed in U.S. Pat. No. 3,215,652.

Chain-extending agents which may be employed in the preparation of the polyurethane foams include those compounds having at least two functional groups bearing active hydrogen atoms such as water, hydrazine, primary and secondary diamines, amino alcohols, amino acids, hydroxy acids, glycols, or mixtures thereof. A preferred group of chain-extending agents includes water, ethylene glycol, 1,4-butanediol and primary and secondary diamines which react more readily with the prepolymer than does water such as phenylene diamine, 1,4-cyclohexane-bis-(methylamine), ethylenediamine, diethylenetriamine, N-(2-hydroxypropyl)ethylenediamine, N,N'-di(2-hydroxypropyl)ethylenediamine, piperazine, and 2-methylpiperazine.

Any suitable catalyst for the preparation of polyurethane foams may be used including tertiary amines such as, for example, triethylenediamine, N-methylmorpholine, N-ethylmorpholine, diethylethanolamine, N-cocomorpholine, 1-methyl-4-dimethylaminoethylpiperazine, 3-methoxypropyldimethylamine, N,N,N'-trimethylisopropyl propylenediamine, 3-diethylaminopropyldiethylamine, dimethylbenzylamine, and the like. Other suitable catalysts are, for example, stannous chloride, dibutyltin di-2-ethyl hexanoate, stannous oxide, as well as other organometallic compounds such as are disclosed in U.S. Pat. No. 2,846,408.

A surface-active agent is generally necessary for production of high grade polyurethane foam according to the present invention, since in the absence of same, the foams collapse or contain very large uneven cells. Numerous surface-active agents have been found satisfactory. Nonionic surface active agents are preferred. Of these, the nonionic surface-active agents such as the well-known silicones have been found particularly desirable. Other surface-active agents which are operative, although not preferred, include polyethylene glycol ethers of long chain alcohols, tertiary amine or alkanolamine salts of long chain alkyl acid sulfate esters, alkyl sulfonic esters, and alkyl arylsulfonic acids.

Among the flame retardants which may be employed are: pentabromodiphenyl oxide, dibromopropanol, tris-(a-chloropropyl)phosphate, 2,2-bis(bromoethyl 1,3-propanediol, tetrakis(2-chloroethyl)ethylene diphosphate, tris(2,3-dibromopropyl)phosphate, tris(a-chloroethyl)phosphate, tris(1,2-dichloropropyl)phosphate, bis-(2-chloroethyl) 2-chloroethyl-phosphonate, molybdenum trioxide, ammonium molybdate, ammonium phosphate, pentabromodiphenyloxide, tricresyl phosphate, hexabromocyclododecane and dibromoethyldibromocyclohexane. The concentrations of flame retardant compounds which may be employed range from 1 to 25 parts per 100 parts of polyol mixture.

The following examples illustrate the nature of the invention. All parts are by weight unless otherwise stated. In the examples, the physical properties of the polyurethane foam were determined by the D3574-81 ASTM tests. Those skilled in the art will understand the Examples are not to be construed as limiting the scope and spirit of the invention.

In Examples 1-6 a four-neck, a one-liter round flask served as a batch reactor (Step B). A similar flask with a bottom drain tube served as a flow reactor (Step A). Both were fitted with a stirrer, nitrogen inlet, addition tube, water condenser and thermometer. The stirrer was normally operated at 300 rpm. In Example 7 a one-liter flow reactor was used in Step A and a five-liter reactor was used in Step B.

In the examples, Polyol A is a glycerin based polyol containing a propylene oxide-ethylene oxide heteric polyol, wherein the propylene oxide is present in an amount of 10 percent by weight, and the hydroxyl number is 50.0.

Polyol B is an adduct of trimethylolpropane and propylene oxide capped with 4.8 percent ethylene oxide. This is treated with maleic anhydride and capped with propylene oxide. The polyol has a hydroxyl number of 22.

Polyol C is a glycerin initiated polyether of poly propylene oxide having a hydroxyl number of about 50 and a molecular weight of about 1120.

VAZO 67 is a trademark of DuPont for 2,2'-azobis(2-methylbutylonitrile) a free radical polymerization initiator.

NAUGARD 445 is a trademark of Uniroyal for 4,4'-bis(a,a-dimethylbenzyl)diphenyl amine.

Graft Polyol I is a graft polyol of acrylonitrile and styrene grafted on a glycerin initiated polyether of propylene oxide having a Hydroxyl number of about 50 and a molecular weight of about 1900.

EXAMPLE 1

Step A—Continuous Process

| Reactant Charges | | | |
|---|---|---|---|
| Reactor | = | 624 g | graft polyol with 40% solid. (40% polymer of 35 parts acrylonitrile and 65 parts styrene in Polyol C |
| Stream #1 | = | 50 g | VAZO 67 |
| | | 7222 g | Polyol A |
| | | 533 g | Polyol B |
| Stream #2 | = | 1672 g | acrylonitrile |
| | | 1673 g | styrene |

-continued

| Reactant Charges | | |
|---|---|---|
| Reaction conditions | = | Reaction temperature, 120° C.<br>Monomer addition rate, 6.24 g/min<br>Polyol/initiator addition rate, 14.56 g/min<br>Reaction time, 30 minutes<br>Reaction volume = 600 ml |

Results

After two hours into addition the product was collected. It had a nominal solid content of 30%. Its viscosity was 1950 cps.

Step B—Semi-batch Process

| Reactant Charges | | | |
|---|---|---|---|
| Reactor | = | 480 g | graft polyol with 30% solid from Step A. |
| Stream #1 | = | 1.44 g | VAZO 67 |
| | | 22.56 g | Polyol A |
| Stream #2 | = | 48 g | acrylonitrile |
| | | 48 g | styrene |
| Reaction conditions | = | | Reaction temperature, 120° C.<br>Monomer addition time, 73 minutes<br>Polyol/initiator addition time, 83 minutes<br>Reaction time, 30 minutes |

Results

As produced, the product had a viscosity of 4150 cps. After stripping for 30 minutes at 120° C. and 4 mm Hg, the finished product had a viscosity of 5720 cps. It had a nominal solid content of 40%.

EXAMPLE 2

Step A

The graft polyol with 30% solid made in Step A, Example 1 was used in Step B.

Step B

This was a repeat of Step B, Example 1. The unstripped product had a viscosity of 4200 cps.

EXAMPLE 3

Step A

The graft polyol with 30% solid made in Step A, Example 1 was used in Step B.

Step B

| Reactant Charges | | | |
|---|---|---|---|
| Reactor | = | 416 g | graft polyol with 30% solid from Step A, Example 1. |
| Stream #1 | = | 1.74 g | VAZO 67 |
| | | 67.24 g | Polyol A |
| Stream #2 | = | 57.5 g | acrylonitrile |
| | | 57.5 g | styrene |
| Reaction conditions | = | | Reaction temperature, 120° C.<br>Monomer addition time, 85 minutes<br>Polyol/initiator addition time, 95 minutes<br>Reaction time, 30 minutes |

Results

As produced, the product had a viscosity of 7370 cps. After stripping for 30 minutes at 120° C. and 4 mm Hg, the finished product had a viscosity of 8560 cps. It had a nominal solid content of 40%.

EXAMPLE 4

Step A

The graft polyol with 30% solid made in Step A, Example 1 was used in Step B.

Step B

| Reactant Charges | | |
|---|---|---|
| Reactor | 320 g | graft polyol with 30% solid from Step A, Example 1 |
| Stream #1 | 2.20 g | VAZO 67 |
| | 129.1 g | Polyol A |
| | 4.7 g | Polyol B |
| Stream #2 | 72 g | acrylonitrile |
| | 72 g | styrene |
| Reaction conditions = | | Reaction temperature, 120° C.<br>Monomer addition time, 110 minutes<br>Polyol initiator addition time, 120 minutes<br>Reaction time, 30 minutes |

Results

As produced the product had a viscosity of 6400 cps. After stripping for 30 minutes at 120° C. and 4 mm Hg, the finished product had a viscosity of 7720 cps. It has a nominal solid content of 40%.

EXAMPLE 5

Step A

Continuous Process

| Reactant Charges | | |
|---|---|---|
| Reactor | 600 ml | graft polyol with 30% solid from Step A, Example 1 |
| Stream #1 | 58 g | VAZO 67 |
| | 8369 g | Polyol A |
| | 533 g | Polyol B |
| Stream #2 | 1920 g | acrylonitrile |
| | 1920 g | styrene |
| Reaction conditions = | | Reaction temperature, 120° C.<br>Monomer addition rate, 6,24 g/min<br>Polyol initiator addition rate, 14.56 g/min<br>Reaction time, 30 minutes<br>Reaction volume, 600 ml |

Results

The last 600 ml of the product was collected. Its viscosity was 2190 cps. It has a solid content of 30%.

Step B

| Reactant Charges | | |
|---|---|---|
| Reactor | 480 g | graft polyol with 30% solid from Step A. |
| Stream #1 | 1.44 g | VAZO 67 |
| | 22.56 g | PLURACOL Polyol 924 |
| Stream #2 | 48 g | acrylonitrile |
| | 48 g | styrene |
| Reaction conditions = | | Reaction temperature, 120° C.<br>Monomer addition time, 72 minutes<br>Polyol initiator addition time, 82 minutes<br>Reaction time, 30 minutes |

Result

As produced, the product has a viscosity of 4060 cps. After stripping for 30 minutes at 120° C. and 4 mm Hg, the finished product has viscosity of 6150 cps. It has a nominal solid content of 40%.

EXAMPLE 6

Step A

| Reactant Charges | | |
|---|---|---|
| Reactor | 600 g | graft polyol with 30% solid from Step A, Example 1 |
| Stream #1 | 20 g | VAZO 67 |
| | 4983 g | Polyol A |
| | 373 g | Polyol B |
| Stream #2 | 672 g | acrylonitrile |
| | 672 g | styrene |
| Reaction conditions = | Reaction temperature, 120° C. | |
| | Monomer addition rate, 4.16 g/min | |
| | Polyol initiator addition rate, 16.64 g/min | |
| | Reaction time, 30 minutes | |
| | Reaction volume, 600 ml | |

Results

The graft polyol had a nominal solid content of 20%. Its viscosity was 950 cps.

Step B

| Reactant Charges | | |
|---|---|---|
| Reactor | 420 g | graft polyol with 20% solid from Step A, |
| Stream #1 | 2.34 g | VAZO 67 |
| | 21.66 g | Polyol A |
| Stream #2 | 78 g | acrylonitrile |
| | 78 g | styrene |
| Reaction conditions = | Reaction temperature, 120° C. | |
| | Monomer addition time, 117 minutes | |
| | Polyol initiator addition time, 127 minutes | |
| | Post addition reaction, 30 minutes | |

Results

As produced the product viscosity is 6040 cps. After stripping for 30 minutes at 120° C. and 4 mm Hg, the finished product has a viscosity of 6350 cps. It has a nominal solid content of 40%.

EXAMPLE 7

Step A

Continuous Process

| Reactant Charges | | |
|---|---|---|
| Reactor | 450 g | Graft Polyol I |
| | 150 g | Graft Polyol C |
| Stream #1 | 22.5 g | VAZO 67 |
| | 3264 g | Polyol C |
| | 208.6 g | Polyol B |
| | 4.9 g | NAUGARD 445 |
| Stream #2 | 750 g | acrylonitrile |
| | 750 g | styrene |
| Reaction conditions = | Reaction temperature, 120° C. | |
| | Monomer addition rate, 6 g/min | |
| | Polyol initiator addition rate, 14 g/min | |
| | Post addition reaction, 30 minutes | |

| Reactant Charges | |
|---|---|
| Reaction volume, 600 ml | |

Results

After one hour into addition, the product was collected. Its viscosity is 2480 cps, It has a solid content of 30%.

Step B

| Reactant Charges | | |
|---|---|---|
| Reactor | 2400 g | graft polyol with 30% solid from Step A. |
| Stream #1 | 7.2 g | VAZO |
| | 112.6 g | Polyol D |
| | 0.2 g | NAUGARD 445 |
| Stream #2 | 240 g | acrylonitrile |
| | 240 g | styrene |
| Reaction conditions = | Reaction temperature, 120° C. | |
| | Monomer addition time, 70 minutes | |
| | Polyol initiator addition time, 80 minutes | |
| | Post addition reaction, 30 minutes | |

Results

After stripping for 30 minutes at 120° C. and 4 mm Hg, the finished product had a viscosity of 6800 cps. It has a solid content of 40%. This example illustrated that the ratio of seeds controlled the product characteristics.

The embodiments of the invention in which an exclusive privilege or property is claimed are defined as follows:

1. A method for preparing graft polymer dispersions having broad particle sized distribution comprising:
   (a) Preparing an intermediate graft polymer dispersion containing 30 percent by weight or less solids to achieve a broad distribution of particle sizes in a continuous process, by feeding a mixture of a polyoxyalkylene polyol, an unsaturated polyol, an ethylenically unsaturated monomer or mixture of ethylenically unsaturated monomers, and a free radical initiator into a continuous flow reactor containing a starting seed graft polyol at a temperature of from about 25° C. to about 180° C.; and,
   (b) Charging the intermediate graft polymer dispersion of (a) to a semi-batch reactor as seeds for further grafting to increase the solids content of the dispersion to about 40 percent by weight, by feeding an amount of an ethylenically unsaturated monomer calculated to raise the solids content to the desired level, and a free radical initiator into the semi-batch reactor at the same temperature as in (a), wherein the particles generally grow large but retain the characteristics of broad size distribution.

2. The method of claim 1, wherein the steps are carried out in a nitrogen atmosphere.

3. The method of claim 1, wherein the temperature of step (a) is from about 80° to 135° C.

4. The method of claim 1, wherein the temperature of step (b) is from about 80° to 135° C.

5. The method of claim 1, wherein the ethylenically unsaturated monomers are selected from the group consisting of acrylonitrile, styrene, vinylidene chloride, methyl methacrylate, acrylamide and mixtures thereof.

6. The method of claim 1, wherein the ethylenically unsaturated monomer is a mixture of acrylonitrile and styrene.

* * * * *